(12) United States Patent
Wang (10) Patent No.: US 7,380,737 B2
(45) Date of Patent: Jun. 3, 2008

(54) ELECTRIC SEASONING MILL

(75) Inventor: Chih-Hung Wang, Tainan Hsien (TW)

(73) Assignee: Duo Yeu Metal. Col, Ltd., Tainan Hsien (TW)

( * ) Notice: Subject to any disclaimer, the term of this patent is extended or adjusted under 35 U.S.C. 154(b) by 0 days.

(21) Appl. No.: 11/385,807

(22) Filed: Mar. 22, 2006

(65) Prior Publication Data

US 2007/0221769 A1    Sep. 27, 2007

(51) Int. Cl.
  *A47J 42/04*    (2006.01)
(52) U.S. Cl. .................................. 241/169.1; 241/258
(58) Field of Classification Search ............. 241/168, 241/169.1, 169, 258
  See application file for complete search history.

(56) References Cited

U.S. PATENT DOCUMENTS

| | | | |
|---|---|---|---|
| 3,734,417 A | 5/1973 | Russell | |
| 4,685,625 A | 8/1987 | Mazza | |
| 4,925,150 A * | 5/1990 | Tedioli | 241/169.1 |
| 5,022,591 A | 6/1991 | Sanders | |
| 6,491,244 B2 * | 12/2002 | Pedersen | 241/169.1 |
| 6,830,205 B2 | 12/2004 | Wang | |
| 6,830,206 B2 | 12/2004 | Yang | |
| 6,962,302 B2 * | 11/2005 | Cheng | 241/169.1 |
| 6,966,507 B2 | 11/2005 | Yang | |
| 6,966,510 B2 | 11/2005 | Pai | |
| 7,007,875 B2 | 3/2006 | Cheng | |
| 7,077,347 B1 | 7/2006 | Wang | |
| 7,293,728 B2 | 11/2007 | Chan et al. | |
| 2003/0052207 A1 * | 3/2003 | Wu | 241/169.1 |

FOREIGN PATENT DOCUMENTS

| | | |
|---|---|---|
| CH | 675961 A5 | 11/1990 |
| DE | 20215609 U1 | 10/2002 |
| GB | 256378 | 8/1926 |
| WO | 8400484 | 2/1984 |

OTHER PUBLICATIONS

Complete file history as of Dec. 19, 2007 of related U.S. Appl. No. 11/560,209.
Complete file history as of Dec. 19, 2007 of U.S. Appl. No. 11/637,891 by the same inventor as the current application.

* cited by examiner

*Primary Examiner*—Faye Francis
(74) *Attorney, Agent, or Firm*—Lathrop & Gage LC (57) ABSTRACT

An electric seasoning mill includes a main body, a motor, a power supply, a control switch, and first and second milling assemblies; the main body has a holding room in each of two ends thereof; the motor is held in a connecting section between the holding rooms; the motor has first and second output shafts at two ends, which will rotate in the same direction, and are each connected to a reduction gear set and an one-way ratchet; the control switch is used for controlling supply of power from the power supply to the motor and for changing rotational direction of the output shafts; the milling assemblies are held in respective ones of the holding rooms, and each includes a turning toothed part, and a secured toothed part around the turning toothed part; transmission shafts are connected to the ratchets and the turning toothed parts.

8 Claims, 9 Drawing Sheets

ELECTRIC SEASONING MILL

BACKGROUND

The present invention relates to an electric seasoning mill capable of containing and dispensing two kinds of seasonings.

In order to preserve the original taste of various kinds of seasonings, seasonings are usually stored in larger particle sizes, and ground and directly dispensed with seasoning grinders when people want to use them.

A currently existing manual seasoning mill structure includes a hollow main body, a rotary operating member connected to an upper end of the hollow main body, a transmission shaft held in the main body and turnable together with the rotary operating member, an inner toothed part joined to a lower end of the transmission shaft, and an outer toothed part positioned around the inner toothed part and secured to an inner side of the main body. Seasonings are contained in the hollow main body. Thus, the inner tooted part will turn relative to the outer toothed part to grind seasonings together with the outer toothed part when the operating member is rotated.

However, it requires unwarranted time and labor to use the manual seasoning mill, and it is difficult for those people who can't use their hands very dexterously to operate such seasoning mills smoothly. Further, this prior art seasoning mill can contain only one kind of seasoning or one kind of seasoning combination instead of two.

Various electric seasoning grinders are available such as were disclosed in Patent CH675961A5, DE20215609U1, U.S. Pat. No. 4,685,625, and U.S. Pat. No. 3,734,417. The electric grinders include a motor, a grinding mechanism, a transmission shaft connected to both the motor and the grinding mechanism, and a switch for turning on/off the motor. However, these grinders, aren't very practical because they can contain only one kind of seasoning or one kind of seasoning combination.

Although there are several different dual-use seasoning grinders available to consumers which have two separate rooms for containing two kinds of seasonings, and although these can grind the two kinds of seasonings separately (such as were disclosed in Patents/applications US2003/052207A1, EP0876787A, and GB256378A , they are hand-operated and not convenient to use.

SUMMARY

An electric seasoning mill according to one embodiment disclosed herein includes a main body, a motor, a power supply unit for supplying power to the motor, at least one control switch, and first and second milling assemblies. The main body has two holding rooms, and the motor has first and second output shafts at two ends of the motor. The milling assemblies are held in respective holding rooms of the main body and are connected to respective output shafts of the motor. The at least one control switch is used for controlling supply of power from the power supply unit to the motor, and for changing the rotational direction of both the first and second output shafts of the motor.

An electric seasoning mill according to another embodiment disclosed herein includes a main body, a motor, a power supply unit for powering the motor, first and second milling assemblies, first and second transmission shafts, and first and second one-way ratchets. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable in concert in a first direction relative to the main body and rotatable in concert in a second direction relative to the main body. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. The first one-way ratchet is operatively coupled to the first output shaft and the first transmission shaft so that the first ratchet rotates the first transmission shaft when the first output shaft is rotated in the first direction, and so tat the first ratchet does not rotate the first transmission shaft when the first output shaft is rotated in the second direction. The second one-way ratchet is operatively coupled to the second output shaft and the second transmission shaft so that the second ratchet rotates the second transmission shaft when the second output shaft is rotated in the second direction, and so that the second ratchet does not rotate the second transmission shaft when the second output shaft is rotated in the first direction. A switch is included for selectively actuating the motor to rotate the first and second output shafts in the first direction and for selectively actuating the motor to rotate the first and second output shafts in the second direction.

An electric seasoning mill according to another embodiment disclosed herein includes a main body, a motor, a power supply unit for powering the motor, first and second milling assemblies, first and second transmission shafts, and first and second one-way ratchets. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable relative to the main body generally simultaneously, and both the first and second output shafts are rotatable in first and second directions relative to the main bed. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. The first one-way ratchet is operatively coupled to the first output shaft and the first transmission shaft so that the first ratchet rotates the first transmission shaft when the first output shaft is rotated in the first direction, and so that the first ratchet does not rotate the first transmission shaft when the first output shaft is rotated in the second direction. The second one-way ratchet is operatively coupled to the second output shaft and the second transmission shaft so that the second ratchet rotates the second transmission shaft when the first output shaft is rotated in the second direction, and so that the second ratchet does not rotate the second transmission shaft when the first output shaft is rotated in the first direction. A switch is included for selectively actuating the motor to rotate the first output shaft in the first direction and for selectively actuating the motor to rotate the first output shaft in the second direction.

An electric seasoning mill according to another embodiment disclosed herein includes a air body, a motor, a power supply unit for powering the motor, first and second milling assemblies, first and second transmission shafts, and a switch. The main body has first and second opposed ends, a first holding room adjacent the first end, and a second holding room adjacent the second end. The motor is housed in the main body between the first and second ends. The motor has a first output shaft extending toward the main body first end and a second output shaft extending toward the main body second end. The first and second output shafts are rotatable in concert in a first direction relative to the main body and in a second direction relative to the main body. The first and second milling assemblies are respectively adjacent the first and second holding rooms; each milling assembly has a stationary portion and a rotatable portion. The first transmission shaft operatively couples the first output shaft and the first milling assembly rotatable portion; the second transmission shaft operatively couples the second output shaft and the second milling assembly rotatable portion. The switch is included for selectively actuating the motor to rotate the first and second output shafts in the first direction and for selectively actuating the motor to rotate the first and second output shafts in the second direction. The switch includes a button having first and second contact points disposed so that one of the contact points is closer than the other to the main body first end, and the switch includes a sliding block alternately adjacent the first and second contact points. Pressing the first contact point completes a first circuit and actuates the motor to rotate the output shafts on one direction; pressing the second contact point completes a second circuit and actuates the motor to rotate the output shafts in another direction. Disposing one of the contact points below another of the contact points causes the sliding block to move adjacent the lowerly-disposed contact point. The first and second circuits may be completed only when the sliding block is adjacent the first and second contact points, respectively.

DETAILED DESCRIPTION

Referring to FIGS. 1 to 9, an electric seasoning mill according to an embodiment includes a main body 1, a motor 2, a power supply unit 3, a control switch 4, two transmission shafts 5, and first and second milling assemblies 6.

The main body 1 has a holding room 11 in each of two ends thereof for containing seasonings; further, the main body 1 has a connecting section 12 between the holding rooms 11, and a longitudinal guiding rail 13 therein.

The motor 2 is held in the connecting section 12 of the main body 1; the motor 2 has first and second output shafts 21 and 21' at two ends thereof; when the motor 2 is activated, the first and the second output shafts 21 and 21' will always rotate in a same direction, and rotational direction of the output shafts 21 and 21' can be changed; in other words, the output shafts 21 and 21' can rotate in a forward direction and they can rotate in a reverse-direction; the output shafts 21 and 21' are each connected to a reduction gear set 22, and the reduction gear sets 22 are each connected to an one-way ratchet 23 at an output parts thereof.

Figure 1:
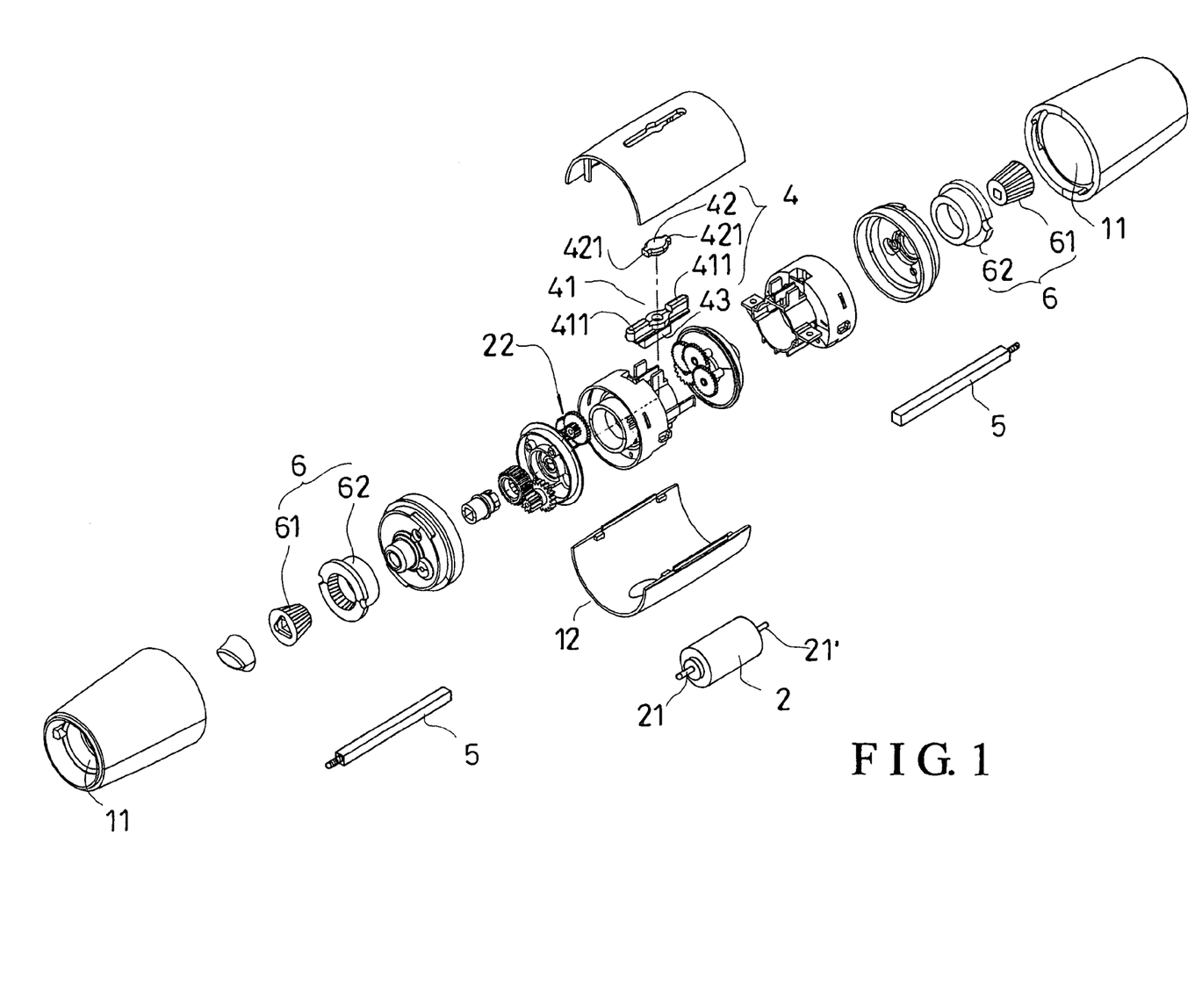
FIG. 1 is an exploded perspective view of a seasoning mill according to an embodiment.
Figure 2:
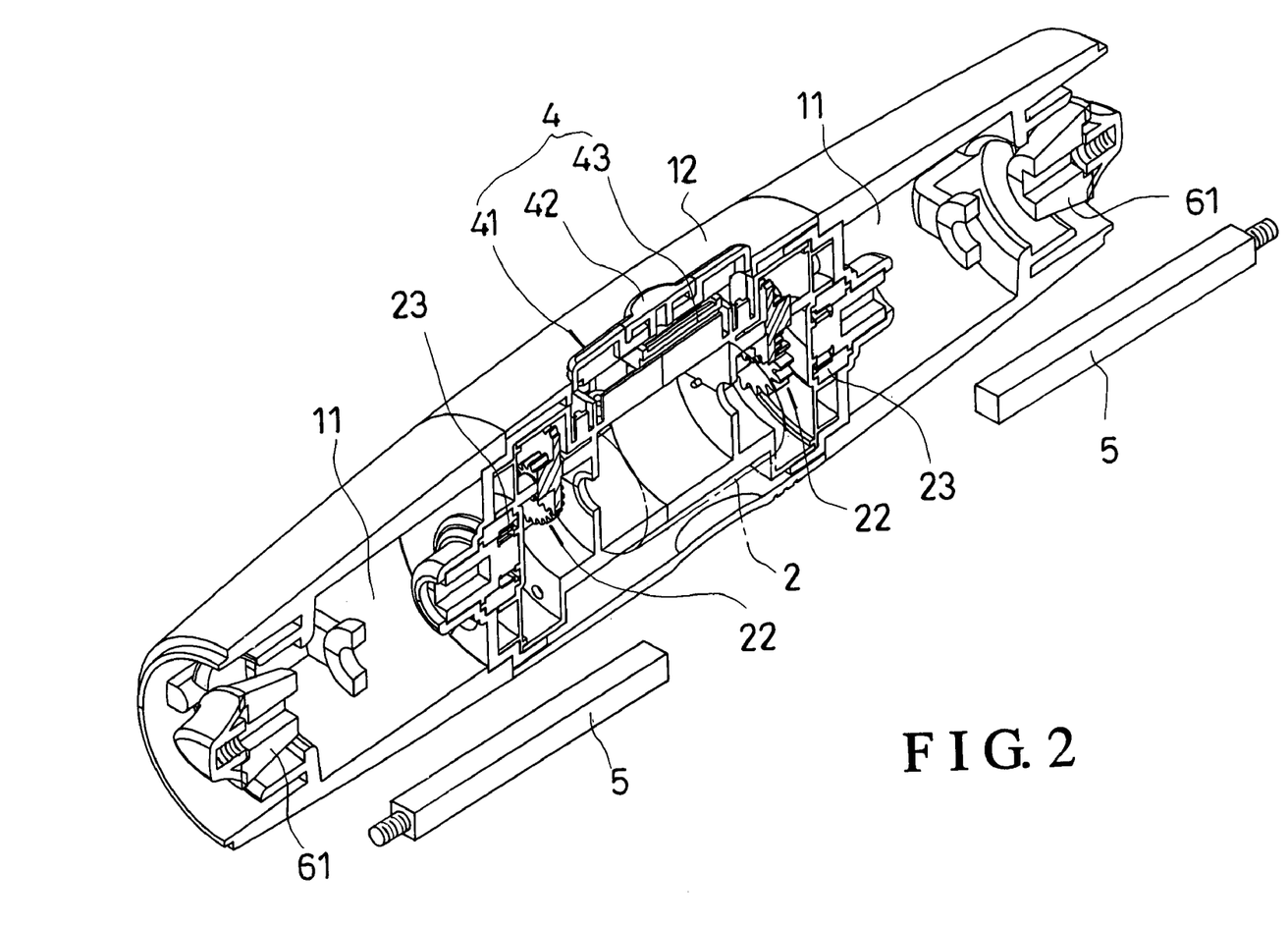
FIG. 2 is a perspective sectional view of the seasoning mill of FIG. 1.
Figure 3:
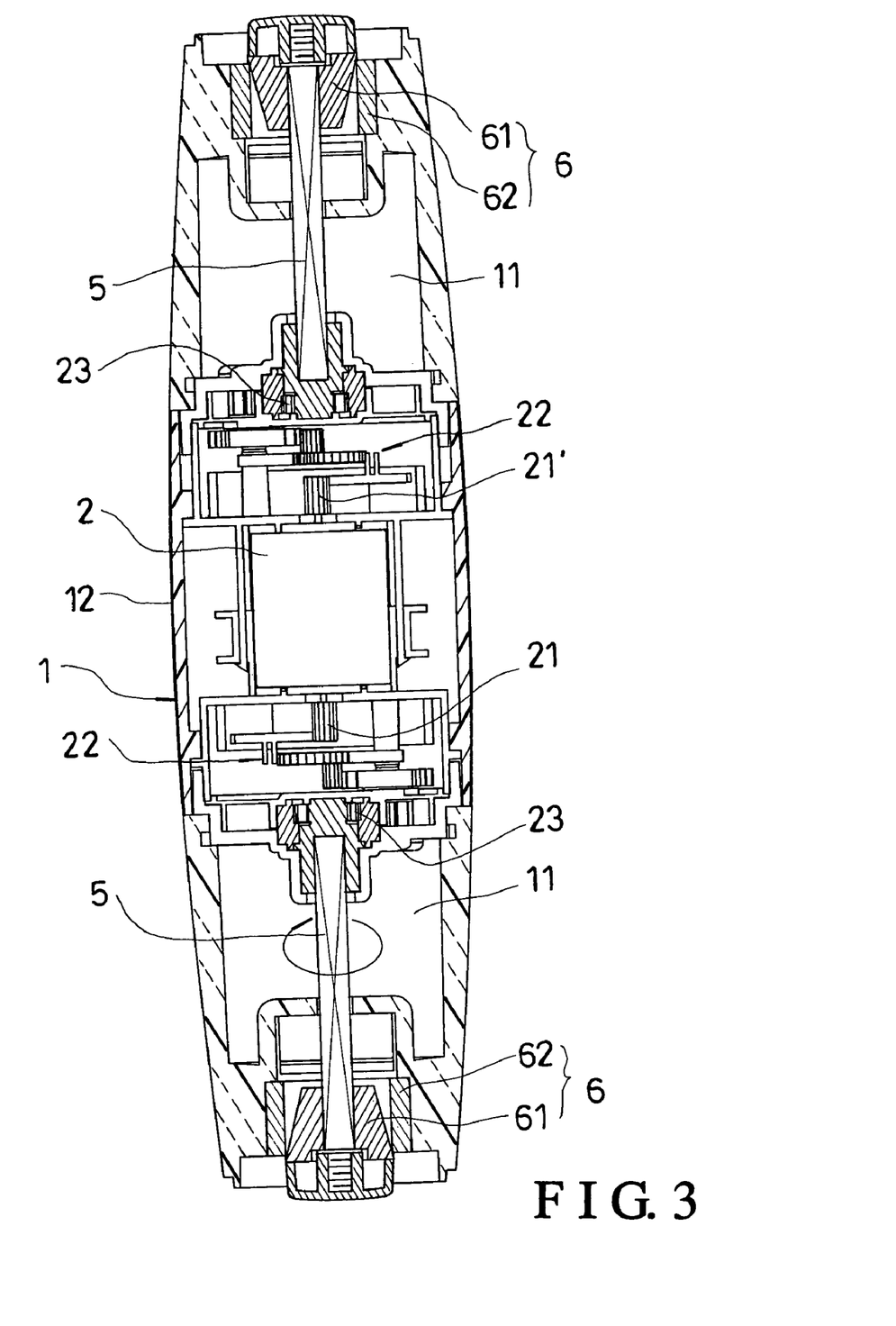
FIG. 3 is a front sectional view of the seasoning mill of FIG. 1.
Figure 4:
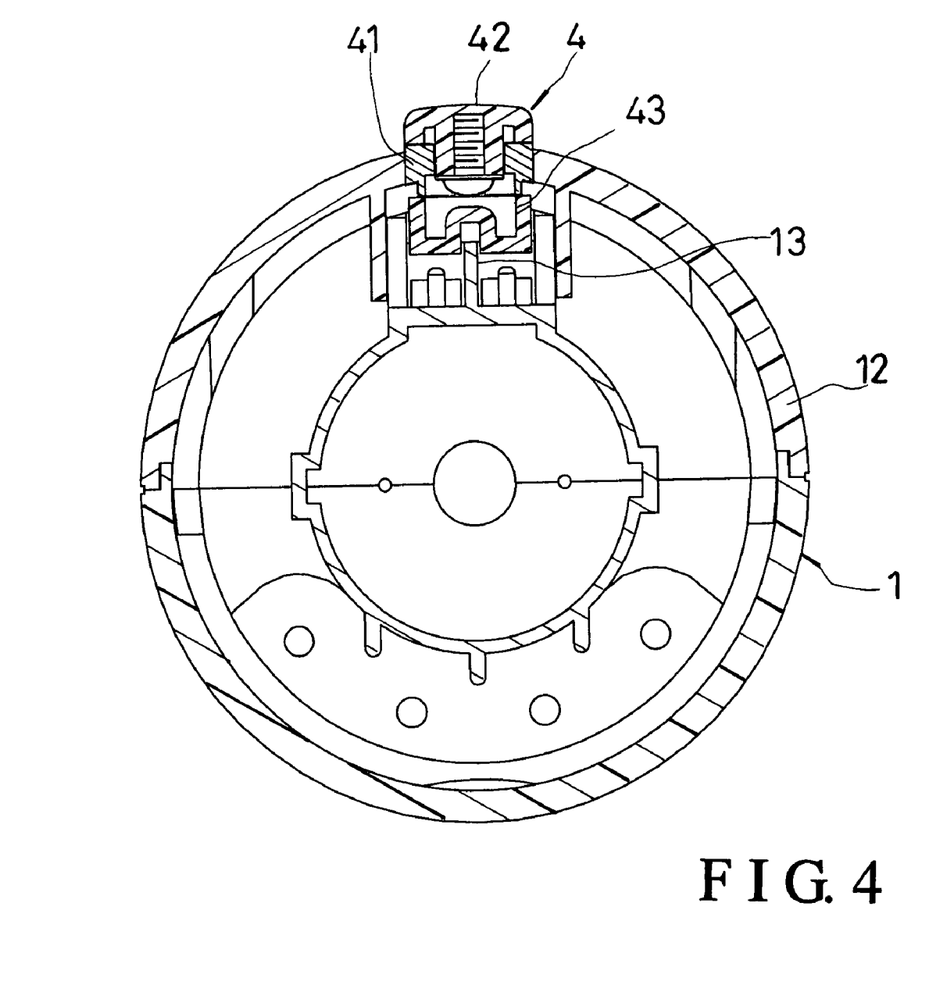
FIG. 4 is a top sectional view of the seasoning mill of FIG. 1.
Figure 5:
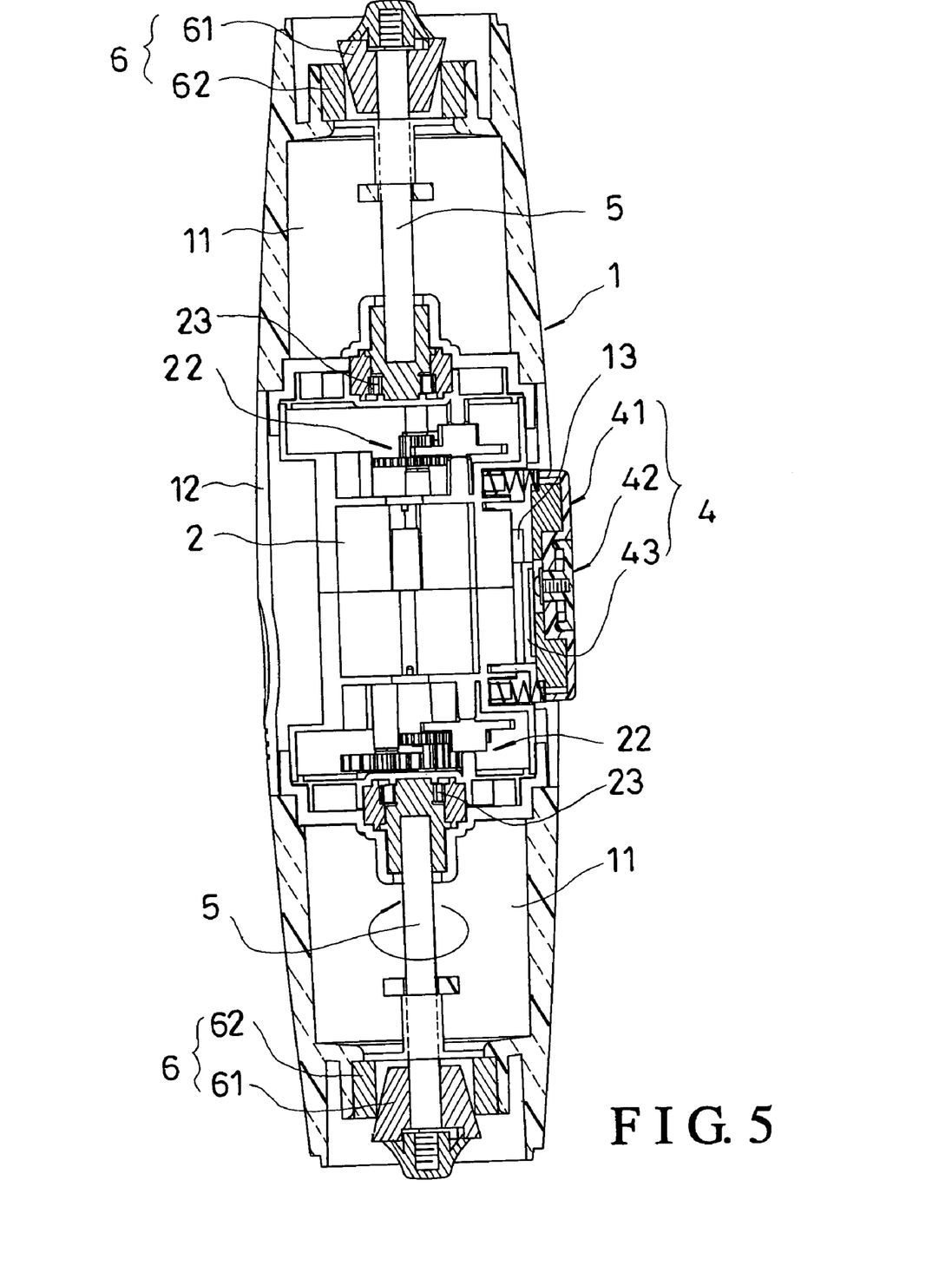
FIG. 5 is a side sectional view of the seasoning mill of FIG. 1.
Figure 6:
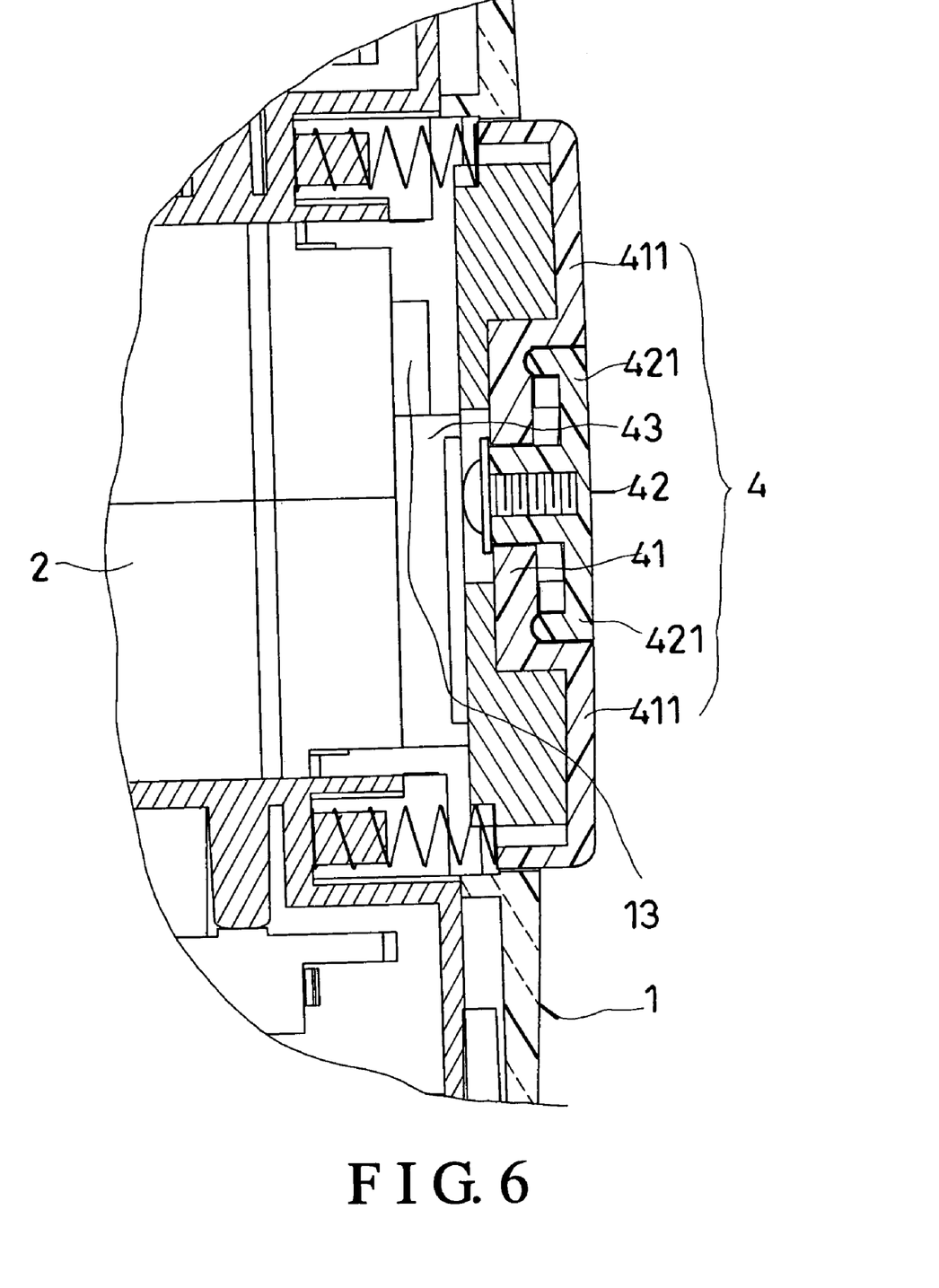
FIG. 6 is a detailed side sectional view of the seasoning mill of FIG. 1.

The power supply unit 3 is held in the connecting section 12 of the main body 1 for supplying power to the motor 2.

Figure 7:
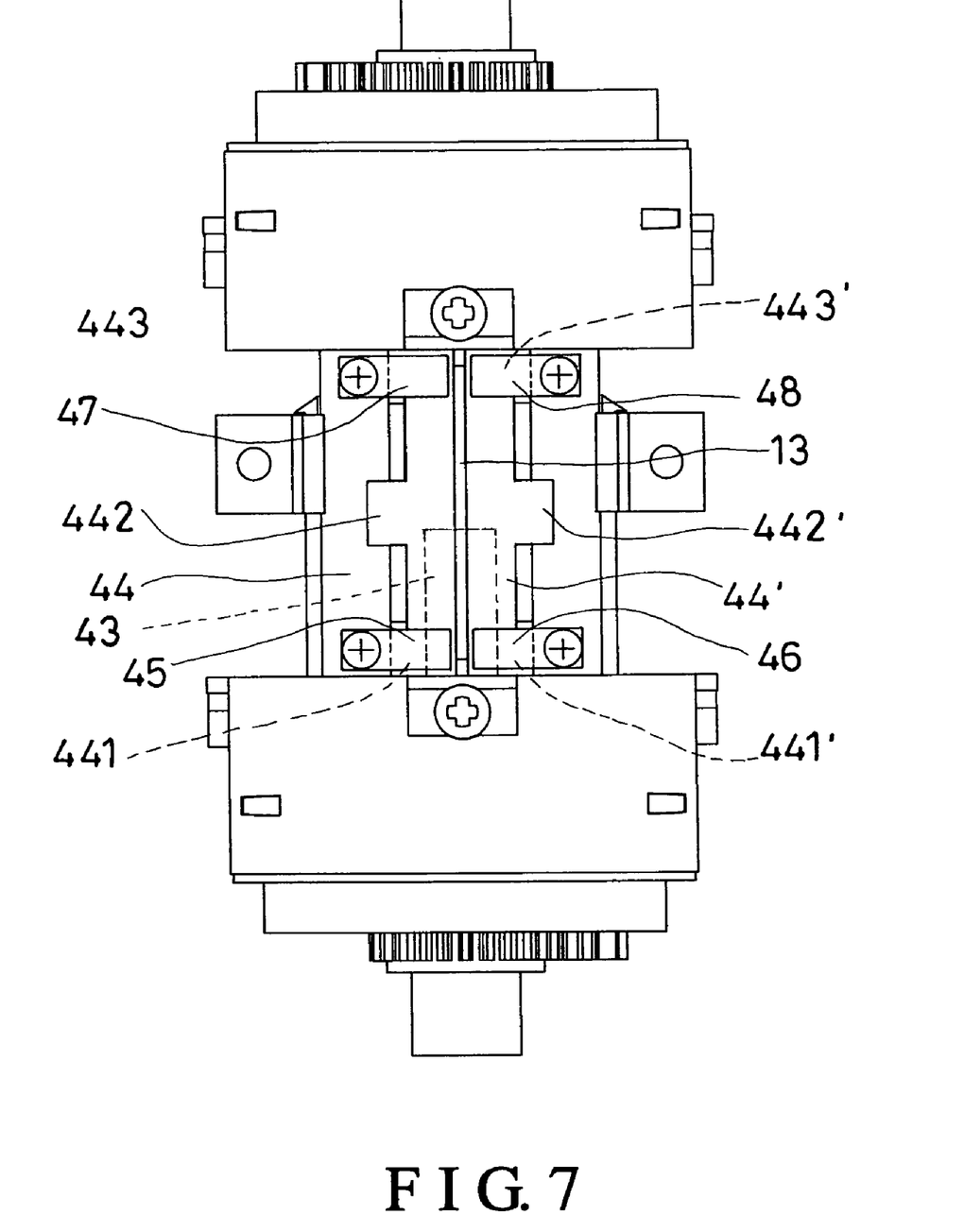
FIG. 7 is a sectional view of a control switch appropriate for use in the seasoning mill of FIG. 1.
Figure 9:
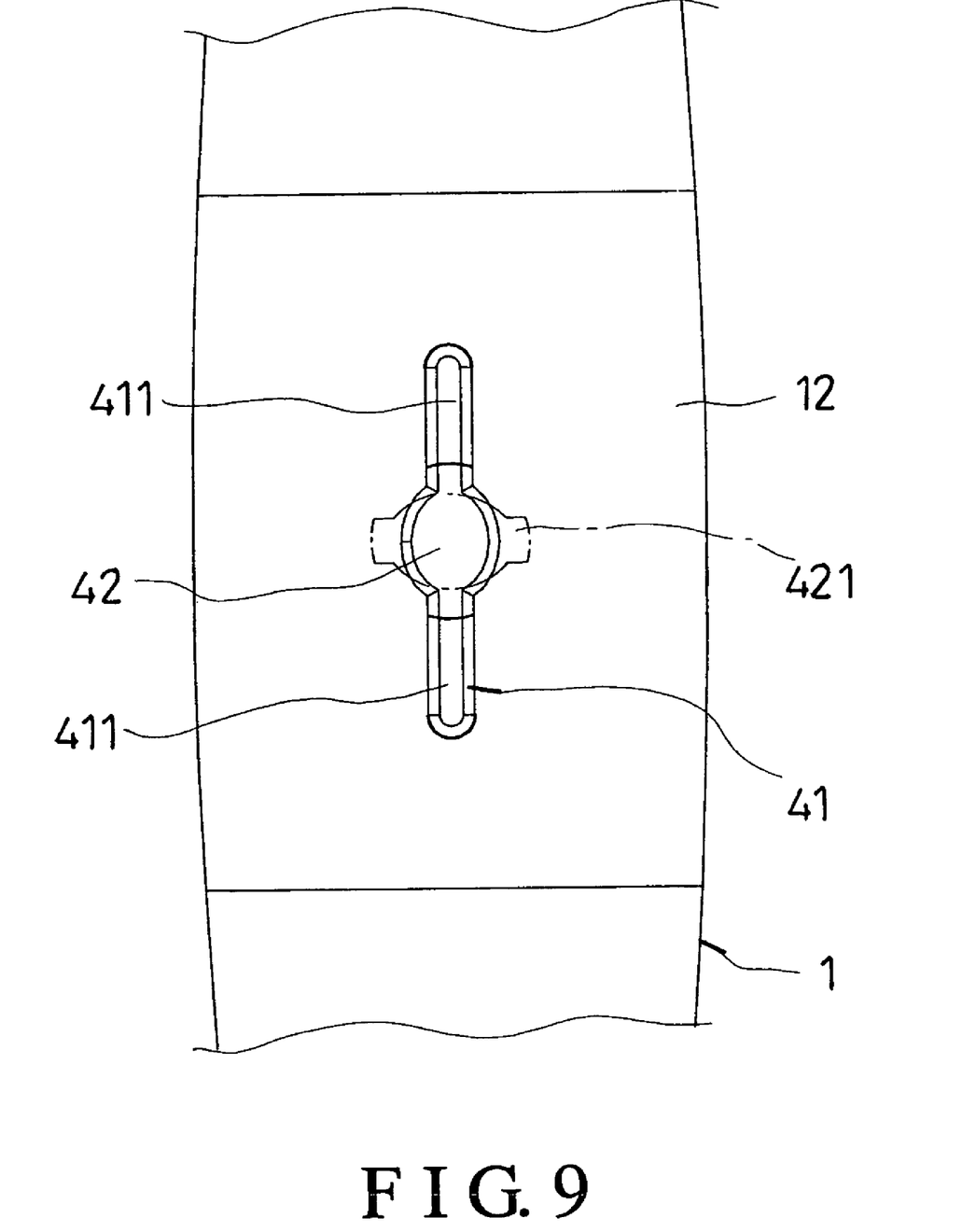
FIG. 9 is a top view of a locking knob appropriate for use in the seasoning mill of FIG. 1.

The control switch 4 is fitted to the connecting section 12 of the main body 1 for controlling supply of power from the power supply unit 3 to the motor 2 as well as for changing the rotational direction of the output shafts 21 and 21' of the motor 2; the control switch 4 includes a button 41, a locking knob 42, a sliding block 43, first and second electricity conducting plates 44 and 44', and first, second, third, and fourth acting plates 45, 46, 47, and 48; the button 41 has first and second pressing portions 411 at two ends thereof, which protrudes outside through a wall of the connecting section 12 of the main body 1; the locking knob 42 has two wing portions 421, and it is positioned between the two pressing portions 411 of the button 41, and can be turned so as to be perpendicular to both the pressing portions 411 for locking the button 41, thus preventing the button 41 from being depressed; the button 41 will unlock when the locking knob 42 is parallel to both the pressing portions 411 of the button 41; the sliding block 43 is positioned next to an inner side of the button 41, and fitted on the guiding rail 13 such that the sliding block 43 will slide along the guiding rail 13 when the main body 1 is held with one end thereof being right above the other.

Figure 8:
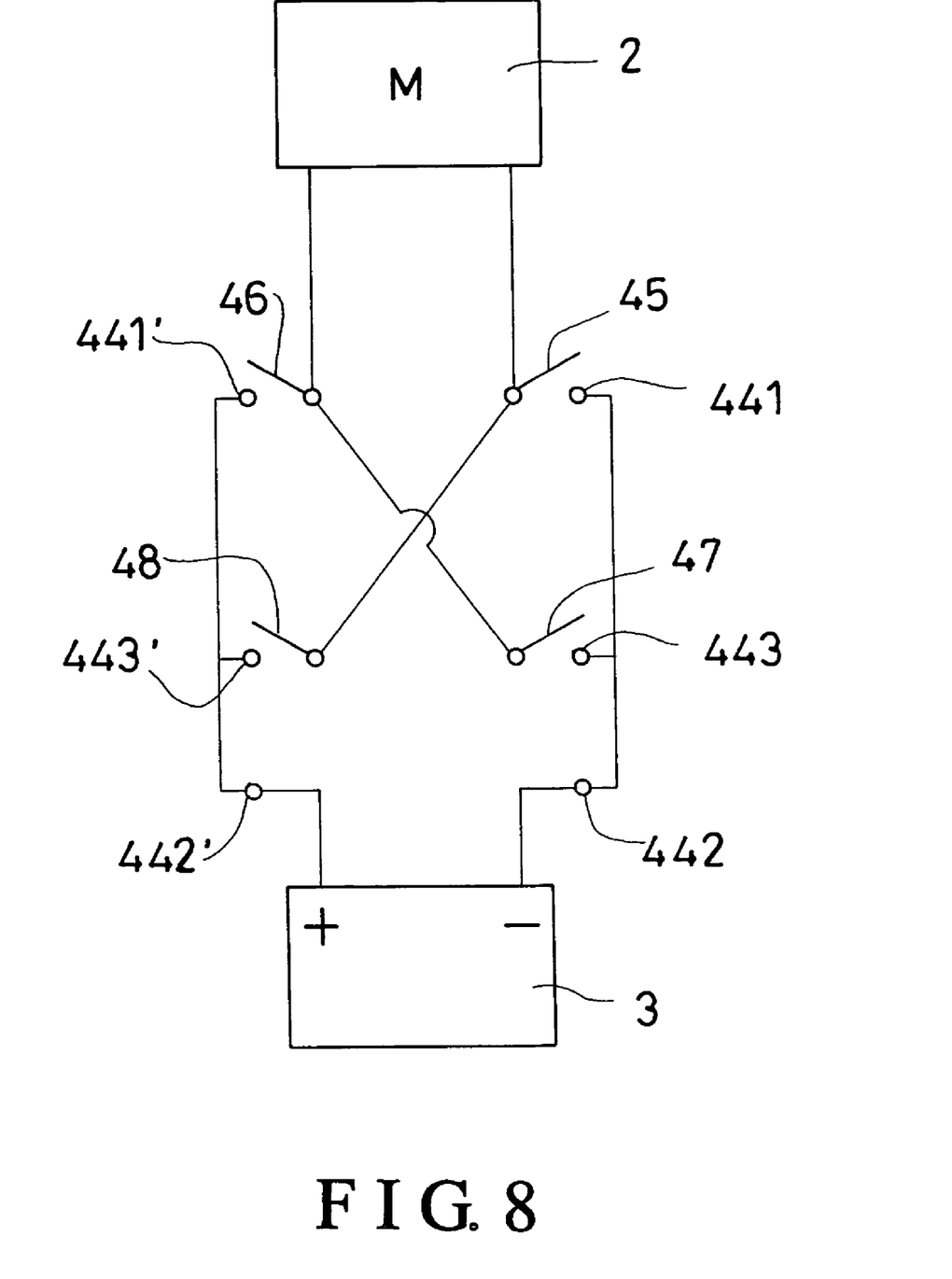
FIG. 8 is a simplified circuit diagram appropriate for use in the seasoning mill of FIG. 1.

The first electricity conducting plate 44 has a contact point (a) 441, a contact point (b) 442, and a contact point (c) 443 while the second electricity conducting plate 44' has a contact point (a) 441', a contact point (b) 442', and a contact point (c) 443'; the contact point (b) 442 is connected to a negative pole of the power supply unit 3 while the contact point (b) 442' is connected to a positive pole of the power supply unit 3; the first acting plate 45 is constantly connected to both the motor 2 and the fourth acting plate 48, and the second acting plate 46 is constantly connected to both the motor 2 and the third acting plate 47, and the wires connecting both the acting plates 45 and 48 cross, and are off the wires connecting both the acting plates 46 and 47; the first acting plate 45 is off and movable to touch the contact point (a) 441 of the first electricity conducting plate 44, and the second acting plate 46 is off and movable to touch the contact point (a) 441' of the second electricity conducting plate 44', and the third acting plate 47 is off and movable to touch the contact point (c) 443, and the fourth acting plate 48 is off and movable to touch the contact point (c) 443' under a normal condition, in which neither of the pressing portions 411 of the button 41 is depressed.

When the sliding block 43 is near to the inner side of the first pressing portion 411 of the button 41, and the first pressing portion 411 is pressed, the sliding block 43 will press the acting plates 45 and 46 to make the acting plates 45 and 46 get into contact with the contact points (a) 441 and 441' respectively, and the motor 2 will be activated to rotate in a first direction; the motor 2 won't be activated when the second pressing portion 411 of the button 41 is pressed.

On the other hand, when the sliding block 43 is near to the inner side of the second pressing portion 411 of the button 41, and the second pressing portion 411 is pressed, the sliding block 43 will press the acting plates 47 and 48 to make the acting plates 47 and 48 get into contact with the contact points (c) 443 and 443' respectively, and the motor 2 will be activated to rotate in a reverse direction opposite to the first one.

The first and the second milling assemblies 6 are held in respective ones of the holding rooms 11 of the main body 1, positioned near to the openings of the holding rooms 11; each of the milling assemblies 6 includes an inner toothed part 61, and an outer toothed part 62, which is positioned around the inner toothed part 61 and secured to the main body 1, near to the opening of the corresponding holding room 11.

The transmission shafts 5 are each held in a respective one of the holding rooms 11, and connected to a respective one of the one-way ratchets 23 at one end such that it will be turned with the one-way ratchet 23 only when the one-way ratchet 23 is turned in a certain predetermined direction; further, the transmission shafts 5 are each connected to a respective one of the inner toothed parts 61 of the milling assemblies 6 at the other end.

Therefore, when the seasoning mill disclosed herein is held with the first output shaft 21 and the corresponding first milling assembly 6 being right under the second output shaft 21' and the second output shaft's corresponding second milling assembly 6 so as to allow the sliding block 43 to slide down along the guiding rail 13 owing to gravity, and when a currently lower one of the pressing portions 411 of the button 41 is pressed, the acting plates 45 and 46 will get into contact with the contact points (a) 441 and 441' respectively, and the motor 2 will start rotating in the first direction for allowing the one-way ratchet 23 connected to the first output shaft 21 to rotate and cause the corresponding transmission shaft 5 to rotate together with it. Thus, the inner toothed part 61 of the first milling assembly 6, which is currently in the lower position, will rotate to grind seasonings together with the outer toothed part 62. On the other hand, the one-way ratchet 23 connected to the second output shaft 21' (currently in the upper position) will rotate, but it won't cause the corresponding transmission shaft 5 to rotate together with it; thus, the second milling assembly 6 (currently in the upper position) won't work. The sliding block 43 will be off the acting plates 45 and 46, and the motor 2 will stop rotating when the user stops pressing the button 41. And, because the sliding block 43 has slid down along the guiding rail 13 to be apart from the second pressing portion 411 of the button 41, the motor 2 won't be activated when the mill is held in the above-mentioned position, and the second pressing portion 411 is pressed.

When the seasoning mill is held in an inverted position, in which position the second output shaft 21' and the corresponding second milling assembly 6 are right under the first output shaft 21 so as to allow the sliding block 43 to slide down along the guiding rail 13 owing to gravity, and when a currently lower one of the pressing portions 411 of the button 41 is pressed, the acting plates 47 and 48 will get into contact with the contact points (c) 443 and 443' respectively, and the motor 2 will start rotating in the reverse direction opposite to the first one for allowing the one-way ratchet 23 connected to the second output shaft 21' to rotate and cause the corresponding transmission shaft 5 to rotate together with it; thus, the inner toothed part 61 of the second milling assembly 6 (currently in the lower position) will rotate to grind seasonings together with the outer toothed part 62. On the other hand, the one-way ratchet 23 connected to the first output shaft 21 (currently in the upper position) will rotate, but it can't cause the corresponding transmission shaft 5 to rotate together with it; thus, the first milling assembly 6 (currently in the upper position) won't work. The sliding block 43 will be off the acting plates 47 and 48, and the motor 2 will stop rotating when the user stops pressing the button 41. And, the motor 2 won't be activated when the first pressing portion 411 of the button 41 is pressed with the mill being held in the above-mentioned position.

Furthermore, when the locking knob 42 is turned to such a position that the wing portions 421 are perpendicular to the pressing portions 411 of the button 41, and right on an outer side of the main body 1, as shown in FIG. 9, the locking knob 42 will prevent the button 41 from being depressed, thus preventing the motor 2 from being accidentally activated.

From the above description, it can be easily seen that an electric seasoning mill disclosed herein has two milling assemblies and two holding rooms for containing two kinds of seasonings or two kinds of seasoning combinations, and only a currently lower one of the milling assemblies will work to grind seasonings contained in the currently lower holding room no mater in which one of the upright and the inverted positions the seasoning mill is held. Therefore, the disclosed electric seasoning mill is relatively convenient to use. Furthermore, the electric seasoning mill disclosed herein can be prevented from being accidentally activated by means of turning the locking knob to such a position as to lock the button of the control switch; therefore, the disclosed electric seasoning mill is relatively safe to use.

What is claimed is:

1. An electric seasoning mill, comprising:
    a main body having first and second opposed ends, a first holding room adjacent the main body first end, and a second holding room adjacent the main body second end;
    a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;
    a power supply unit for powering the motor;
    a switch for selectively actuating the motor to rotate the first and second output shafts in the first direction and for selectively actuating the motor to rotate the first and second output shafts in the second direction;
    first and second milling assemblies respectively adjacent the first and second holding rooms, each milling assembly having a stationary portion and a rotatable portion;
    a first transmission shaft operatively coupling the first output shaft and the first milling assembly rotatable portion;
    a second transmission shaft operatively coupling the second output shaft and the second milling assembly rotatable portion;
    a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction;

wherein the switch includes a button having first and second contact points;

wherein pressing the first contact point completes a first circuit and actuates the motor to rotate the first and second output shafts in one of the first direction and the second direction;

wherein pressing the second contact point completes a second circuit and actuates the motor to rotate the first and second output shafts in another of the first direction and the second direction;

wherein the first and second contact points are disposed so that one of the first and second contact points is closer than the other to the main body first end;

wherein the switch includes a sliding block alternately adjacent the first and second contact points;

wherein disposing one of the button contact points below another of the button contact points causes the sliding block to move adjacent the lowerly-disposed button contact point;

wherein pressing the respective lowerly-disposed button contact point causes the sliding block to complete the respective circuit corresponding to the respective lowerly-disposed button contact point and actuate the motor; and wherein pressing the respective upwardly-disposed button contact point does not actuate the motor.

2. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;

a power supply unit for powering the motor;

a switch for selectively actuating the motor to rotate the first and second output shafts in the first direction and for selectively actuating the motor to rotate the first and second output shafts in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction;

wherein the switch includes a button having first and second contact points;

wherein pressing the first contact point completes a first circuit and actuates the motor to rotate the first and second output shafts in one of the first direction and the second direction;

wherein pressing the second contact point completes a second circuit and actuates the motor to rotate the first and second output shafts in another of the first direction and the second direction;

wherein the first and second contact points are disposed so that one of the first and second contact points is closer than the other to the main body first end;

wherein the switch includes a sliding block alternately adjacent the first and second contact points;

wherein disposing one of the button contact points below another of the button contact points causes the sliding block to move adjacent the lowerly-disposed button contact point;

wherein pressing the first contact point completes the first circuit only when the first contact point is disposed below the second contact point and the sliding block is adjacent the first contact point; and wherein pressing the second contact point completes the second circuit only when the second contact point is disposed below the first contact point and the sliding block is adjacent the second contact point.

3. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;

a power supply unit for powering the motor;

a switch for selectively actuating the motor to rotate the first and second output shafts in the first direction and for selectively actuating the motor to rotate the first and second output shafts in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the second output shaft is rotated in the second direction, the second ratchet not rotating the second transmission shaft when the second output shaft is rotated in the first direction;

wherein the switch includes a button having first and second contact points;

wherein pressing the first contact point completes a first circuit and actuates the motor to rotate the first and second output shafts in one of the first direction and the second direction;

wherein pressing the second contact point completes a second circuit and actuates the motor to rotate the first and second output shafts in another of the first direction and the second direction;

wherein the switch includes an elongate lock between the first and second contact points;

wherein the elongate lock is movable between a first configuration generally parallel to an imaginary line connecting the first and second contact points and a second configuration generally perpendicular to the imaginary line; and wherein the elongate lock prevents the button from being depressed and prevents the first and second circuits from being completed only when the elongate lock is at the second configuration.

4. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable relative to the main body generally simultaneously, both the first and second output shafts being rotatable in first and second directions relative to the main body;

a power supply unit for powering the motor;

a switch for selectively actuating the motor to rotate the first output shaft in the first direction and for selectively actuating the motor to rotate the first output shaft in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the first output shaft is rotated in the second direction, the second ratchet not rotating the second transmission shaft when the first output shaft is rotated in the first direction;

wherein the switch includes a button having first and second contact points;

wherein pressing the first contact point completes a first circuit and actuates the motor to rotate the first output shaft in the first direction;

wherein pressing the second contact point completes a second circuit and actuates the motor to rotate the first output shaft in the second direction;

wherein the first and second contact points are disposed so that one of the first and second contact points is closer than the other to the main body first end;

wherein the switch includes a sliding block alternately adjacent the first and second contact points;

wherein disposing one of the button contact points below another of the button contact points causes the sliding block to move adjacent the lowerly-disposed button contact point;

wherein pressing the respective lowerly-disposed button contact point causes the sliding block to complete the respective circuit corresponding to the respective lowerly-disposed button contact point and actuate the motor; and wherein pressing the respective upwardly-disposed button contact point does not actuate the motor.

5. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable relative to the main body generally simultaneously, both the first and second output shafts being rotatable in first and second directions relative to the main body;

a power supply unit for powering the motor;

a switch for selectively actuating the motor to rotate the first output shaft in the first direction and for selectively actuating the motor to rotate the first output shaft in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the first output shaft is rotated in the second direction, the second ratchet not rotating the second transmission shaft when the first output shaft is rotated in the first direction;

wherein the switch includes a button having first and second contact points;

wherein pressing the first contact point completes a first circuit and actuates the motor to rotate the first output shaft in the first direction;

wherein pressing the second contact point completes a second circuit and actuates the motor to rotate the first output shaft in the second direction;

wherein the first and second contact points are disposed so that one of the first and second contact points is closer than the other to the main body first end;

wherein the switch includes a sliding block alternately adjacent the first and second contact points;

wherein disposing one of the button contact points below another of the button contact points causes the sliding block to move adjacent the lowerly-disposed button contact point;

wherein pressing the first contact point completes the first circuit only when the first contact point is disposed below the second contact point and the sliding block is adjacent the first contact point; and wherein pressing the second contact point completes the second circuit only when the second contact point is disposed below the first contact point and the sliding block is adjacent the second contact point.

6. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable relative to the main body generally simultaneously, both the first and second output shafts being rotatable in first and second directions relative to the main body;

a power supply unit for powering the motor;

a switch for selectively actuating the motor to rotate the first output shaft in the first direction and for selectively actuating the motor to rotate the first output shaft in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

a first one-way ratchet operatively coupled to the first output shaft and the first transmission shaft, the first ratchet rotating the first transmission shaft when the first output shaft is rotated in the first direction, the first ratchet not rotating the first transmission shaft when the first output shaft is rotated in the second direction; and a second one-way ratchet operatively coupled to the second output shaft and the second transmission shaft, the second ratchet rotating the second transmission shaft when the first output shaft is rotated in the second direction, the second ratchet not rotating the second transmission shaft when the first output shaft is rotated in the first direction;

wherein the switch includes a button having first and second contact points;

wherein pressing the first contact point completes a first circuit and actuates the motor to rotate the first output shaft in the first direction;

wherein pressing the second contact point completes a second circuit and actuates the motor to rotate the first output shaft in the second direction;

wherein the switch includes an elongate lock between the first and second contact points;

wherein the elongate lock is movable between a first configuration generally parallel to an imaginary line connecting the first and second contact points and a second configuration generally perpendicular to the imaginary line; and wherein the elongate lock prevents the button from being depressed and prevents the first and second circuits from being completed only when the elongate lock is at the second configuration.

7. An electric seasoning mill, comprising:

a main body having first and second opposed ends, a first holding room adjacent the main body first end, and a second holding room adjacent the main body second end;

a motor housed in the main body between the main body first and second ends, the motor having a first output shaft extending toward the main body first end and a second output shaft extending toward the main body second end, the first and second output shafts being rotatable in concert in a first direction relative to the main body, the first and second output shafts being rotatable in concert in a second direction relative to the main body;

a power supply unit for powering the motor;

a switch for selectively actuating the motor to rotate the first and second output shafts in the first direction and for selectively actuating the motor to rotate the first and second output shafts in the second direction;

first and second milling assemblies respectively adjacent the first and second holding rooms, each milling assembly having a stationary portion and a rotatable portion;

a first transmission shaft operatively coupling the first output shaft and the first milling assembly rotatable portion;

a second transmission shaft operatively coupling the second output shaft and the second milling assembly rotatable portion;

wherein the switch includes a button having first and second contact points disposed so that one of the first and second contact points is closer than the other to the main body first end;

wherein pressing the first contact point completes a first circuit and actuates the motor to rotate the first and second output shafts in one of the first direction and the second direction;

wherein pressing the second contact point completes a second circuit and actuates the motor to rotate the first and second output shafts in another of the first direction and the second direction;

wherein the switch includes a sliding block alternately adjacent the first and second contact points;

wherein disposing one of the button contact points below another of the button contact points causes the sliding block to move adjacent the lowerly-disposed button contact point;

wherein pressing the first contact point completes the first circuit only when the first contact point is disposed below the second contact point and the sliding block is adjacent the first contact point; and wherein pressing the second contact point completes the second circuit only when the second contact point is disposed below the first contact point and the sliding block is adjacent the second contact point.

8. The electric seasoning mill of claim 7, wherein:

the switch includes an elongate lock between the first and second contact points;

the elongate lock is movable between a first configuration generally parallel to an imaginary line connecting the first and second contact points and a second configuration generally perpendicular to the imaginary line; and the elongate lock prevents the button from being depressed and prevents the first and second circuits from being completed only when the elongate lock is at the second configuration.

* * * * *

UNITED STATES PATENT AND TRADEMARK OFFICE
CERTIFICATE OF CORRECTION

| | | |
|---|---|---|
| PATENT NO. | : 7,380,737 B2 | Page 1 of 1 |
| APPLICATION NO. | : 11/385807 | |
| DATED | : June 3, 2008 | |
| INVENTOR(S) | : Chih-Hung Wang | |

It is certified that error appears in the above-identified patent and that said Letters Patent is hereby corrected as shown below:

Column 1, line 21, "tooted part" should read --toothed part--;

Signed and Sealed this

Fourteenth Day of April, 2009

JOHN DOLL
*Acting Director of the United States Patent and Trademark Office*